United States Patent
Shu et al.

(10) Patent No.: US 10,655,062 B2
(45) Date of Patent: May 19, 2020

(54) HIGHLY VERTICAL DIELECTRIC LIQUID CRYSTAL COMPOSITION AND LIQUID CRYSTAL DISPLAY DEVICE

(71) Applicant: SHIJIAZHUANG CHENGZHI YONGHUA DISPLAY MATERIAL CO., LTD, Shijiazhuang, Hebei Prov. (CN)

(72) Inventors: Ke-Lun Shu, Shijiazhuang (CN); Mingxia Wang, Shijiazhuang (CN); Huan Liu, Shijiazhuang (CN); Wenxiao Xing, Shijiazhuang (CN); Zhengqiang Li, Shijiazhuang (CN); Yiping Wang, Shijiazhuang (CN); Yongfeng Bao, Shijiazhuang (CN); Guoliang Yun, Shijiazhuang (CN)

(73) Assignee: SHIJIAZHUANG CHENGZHI YONGHUA DISPLAY MATERIAL CO., LTD, Shijiazhuang, Hebei Prov. (CN)

( * ) Notice: Subject to any disclaimer, the term of this patent is extended or adjusted under 35 U.S.C. 154(b) by 184 days.

(21) Appl. No.: 15/827,222

(22) Filed: Nov. 30, 2017

(65) Prior Publication Data

US 2019/0100696 A1 Apr. 4, 2019

(30) Foreign Application Priority Data

Sep. 30, 2017 (CN) .......................... 2017 1 0917336

(51) Int. Cl.
| | | |
|---|---|---|
| *C09K 19/20* | (2006.01) | |
| *C09K 19/12* | (2006.01) | |
| *C09K 19/56* | (2006.01) | |
| *G02F 1/1337* | (2006.01) | |
| *C09K 19/44* | (2006.01) | |
| *G02F 1/13* | (2006.01) | |
| *C09K 19/14* | (2006.01) | |
| *C09K 19/30* | (2006.01) | |
| *C09K 19/34* | (2006.01) | |
| *C09K 19/04* | (2006.01) | |

(52) U.S. Cl.
CPC .......... *C09K 19/2028* (2013.01); *C09K 19/12* (2013.01); *C09K 19/14* (2013.01); *C09K 19/20* (2013.01); *C09K 19/3066* (2013.01); *C09K 19/3098* (2013.01); *C09K 19/3491* (2013.01); *C09K 19/44* (2013.01); *C09K 19/56* (2013.01); *G02F 1/1303* (2013.01); *G02F 1/1337* (2013.01); *C09K 2019/0466* (2013.01); *C09K 2019/122* (2013.01); *C09K 2019/123* (2013.01); *C09K 2019/301* (2013.01); *C09K 2019/3009* (2013.01); *C09K 2019/3016* (2013.01); *C09K 2019/3021* (2013.01); *C09K 2019/3027* (2013.01); *C09K 2019/3408* (2013.01); *C09K 2019/3422* (2013.01); *Y10T 428/10* (2015.01)

(58) Field of Classification Search
CPC ............ C09K 19/2028; C09K 19/3098; C09K 19/3066; C09K 19/20; C09K 19/14; C09K 19/44; C09K 2019/3027; C09K 2019/0466; G02F 1/1337; G02F 1/1303; Y10T 428/10
USPC ...... 428/1.1, 1.6; 252/299.01, 299.6, 299.63, 252/299.64, 299.68
See application file for complete search history.

(56) References Cited

U.S. PATENT DOCUMENTS

2009/0141215 A1* 6/2009 Bremer ................. C07C 39/367
349/86

FOREIGN PATENT DOCUMENTS

CN 105131971 A * 12/2015

* cited by examiner

*Primary Examiner* — Ruiyun Zhang
(74) *Attorney, Agent, or Firm* — Muncy, Geissler, Olds & Lowe, P.C.

(57) ABSTRACT

A liquid crystal composition having one or more compounds represented by formula I, one or more compounds represented by formula II and one or more compounds represented by formula III:

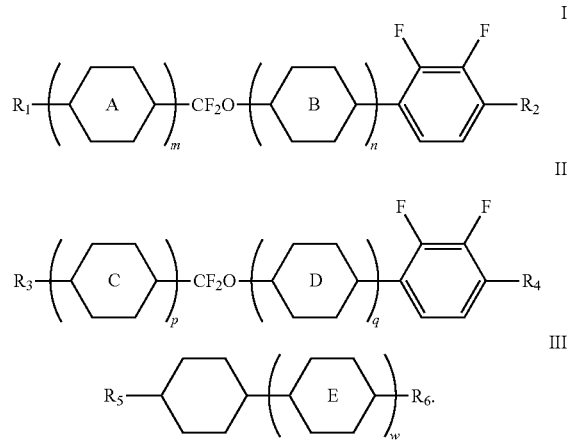

The liquid crystal composition has a good stability against light and heat and a lower viscosity, and can achieve a wider refractive index and higher clearing point by the adjustment the ratio of the monomers. In particular, the liquid crystal composition has a higher light transmittance, allowing a display device to have a higher brightness or an energy saving effect.

5 Claims, No Drawings

HIGHLY VERTICAL DIELECTRIC LIQUID CRYSTAL COMPOSITION AND LIQUID CRYSTAL DISPLAY DEVICE

TECHNICAL FIELD

The present invention belongs to the technical field of liquid crystal materials, and particularly relates to a highly vertical dielectric liquid crystal composition and a liquid crystal display device containing such a liquid crystal.

BACKGROUND ART

At present, the expansion of application range of liquid crystal compounds is becoming larger and larger, and the liquid crystal compounds can be used in various types of displays, electro-optical devices, sensors, etc. There are a great variety of liquid crystal compounds used in the above-mentioned display field, wherein nematic liquid crystals are used most extensively. Nematic liquid crystals have been used in passive TN and STN matrix displays and systems having a TFT active matrix.

With regard to the application field of thin film transistor techniques (TFT-LCD), although the market in recent years has become very huge, and the techniques also have become gradually mature, requirements of display techniques are increasing continuously, especially in terms of achieving a quick response, reducing the drive voltage for reducing power consumption, etc. Liquid crystal materials, as one of the important optoelectronic materials for liquid crystal displays, play an important role in improving the performance of a liquid crystal display.

Liquid crystal materials need to have good chemical and thermal stabilities and stabilities to electric fields and electromagnetic radiations. Moreover, as liquid crystal materials used for thin film transistor techniques (TFT-LCD), they not only need to have the stabilities as mentioned above, but also should have properties, such as a broader nematic phase temperature range, an appropriate birefringence anisotropy, a very high electrical resistivity, a good ultraviolet resistant property, a high charge retention rate, a low vapor pressure, etc.

For dynamic picture display applications, the elimination of display picture ghosting and trailing requires liquid crystals to have a very quick response speed, and therefore the liquid crystals are required to have a lower rotary viscosity $\gamma_1$. Moreover, for portable devices, in order to reduce the device energy consumption, it is desirable for the drive voltage of the liquid crystals to be as low as possible; and for displays for uses such as televisions, the requirements for the drive voltage of the liquid crystals are not as low as necessary.

The viscosity, in particular rotary viscosity $\gamma_1$, of a liquid crystal compound directly affects the response time after the liquid crystal is energized, and both the rise time ($t_{on}$) and fall time ($t_{off}$) are proportional to the rotary viscosity $\gamma_1$ of the liquid crystal. Moreover, since the rise time ($t_{on}$) is related to a liquid crystal cell and the drive voltage, it can be adjusted by means of increasing the drive voltage and reducing the thickness of the liquid crystal cell; while the fall time ($t_{off}$) is irrelevant to the drive voltage, but is mainly related to the elastic constant of the liquid crystal and the thickness of the liquid crystal cell, and thinning of cell thickness can result in a decrease in fall time ($t_{off}$). Moreover, in different display modes, the movement manners of liquid crystal molecules are different, and the three modes TN, IPS and VA are inversely proportional to the mean elastic constant K, twist elastic constant and bend elastic constant, respectively.

According to the continuum theory of liquid crystal, a variety of different liquid crystals deformed under the action of an external force (an electric field, a magnetic field) can "rebound" back to the original shapes by intermolecular interactions; likewise, liquid crystals also form a "viscosity" due to the intermolecular force. Small changes of liquid crystal molecules may result in obvious changes in the conventional parameter performance of the liquid crystal, wherein for some of these changes, there is a certain rule, while for some changes, it is difficult to find a rule, which may also have obvious effects on the intermolecular interaction of the liquid crystal, these effects are very subtle, and to date, no perfect theoretical explanation has been formed yet.

The viscosity of a liquid crystal is related to the molecular structure of the liquid crystal, and studying the relationship between the viscosity of a liquid crystal system formed from different liquid crystal molecules and the molecular structures of the liquid crystals is one of important tasks of liquid crystal formulation engineers.

The reason why a liquid crystal display panel has a high energy consumption is that only about 5% of backlight can transmit through a display device and then be captured by human eyes, while most of the light is "wasted". If a liquid crystal having a high light transmittance can be developed, then the backlight intensity can be reduced, thereby achieving the purpose of saving energy consumption and extending the service time of a device.

SUMMARY OF THE INVENTION

The technical problem to be solved by the present invention is to provide a liquid crystal composition having a good stability against light and heat, a lower viscosity, a wider refractive index that may be achieved by adjusting the monomer ratio, and a higher clearing point (a very wide service temperature range), and in particular, the liquid crystal composition has a higher light transmittance, thus allowing a display device to have a higher brightness or an energy saving effect.

In order to solve the above-mentioned technical problems, the present invention provides a liquid crystal composition comprising one or more compounds represented by formula I, one or more compounds represented by formula II and one or more compounds represented by formula III:

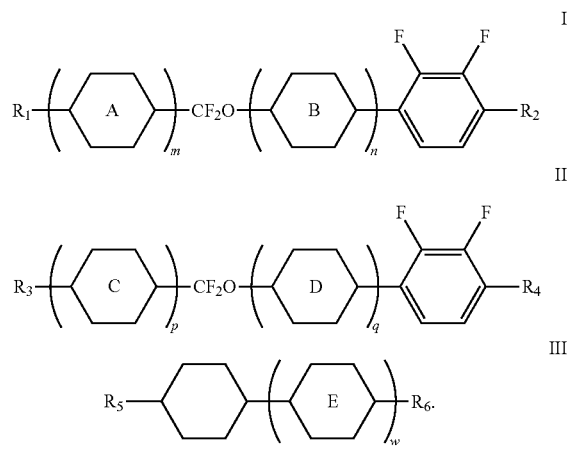

wherein wherein $R_1$, $R_2$, $R_3$, $R_5$ and $R_6$ each independently represent an alkyl group having a carbon atom number of 1-10, an alkoxy group having a carbon atom number of 1-10, an alkenyl group having a carbon atom number of 2-10 or an alkenoxy group having a carbon atom number of 3-8, and any one or more non-connected $CH_2$ in the groups represented by $R_1$ and $R_3$ may be substituted with cyclopentyl, cyclobutyl, cyclopropyl or —O—;

$R_4$ represents F, $CF_3$, $OCF_3$, $OCHF_2$ or $OCH_2F$;

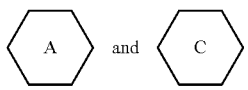

each independently represent one or more of

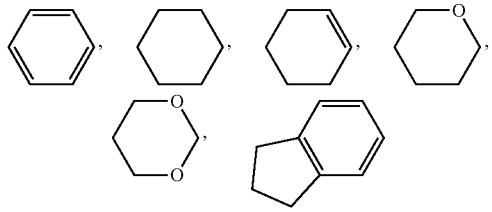

and any fluorobenzene;

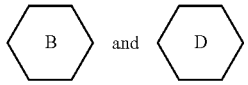

each independently represent one or two of benzene or fluorobenzene;

represents one or more of

or any fluorobenzene;

m, p and w each independently represent 1, 2 or 3; and n and q each independently represent 0 or 1.

The one or more compounds represented by formula I are preferably one or more of compounds represented by formulas I1 to I14; the one or more compounds represented by formula II are preferably one or more of compounds represented by formulas II1 to II14; and the one or more compounds represented by formula III are preferably one or more of compounds represented by formulas III1 to III5:

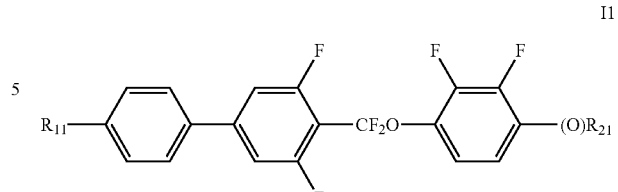
I1

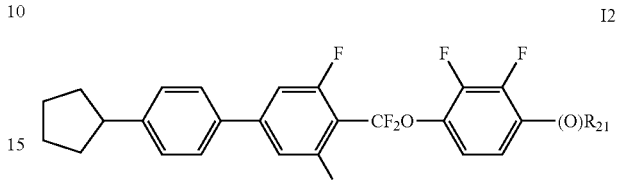
I2

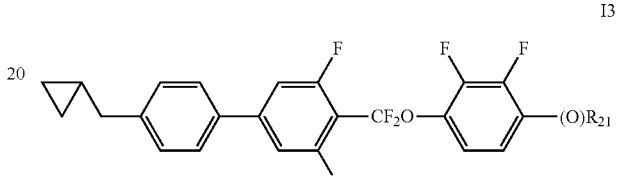
I3

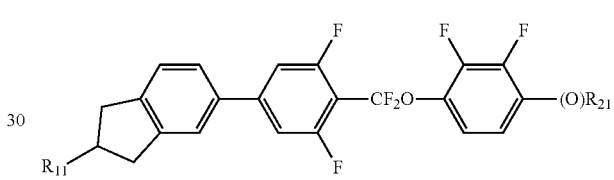
I4

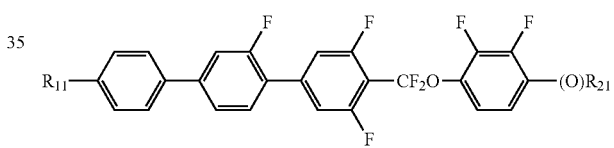
I5

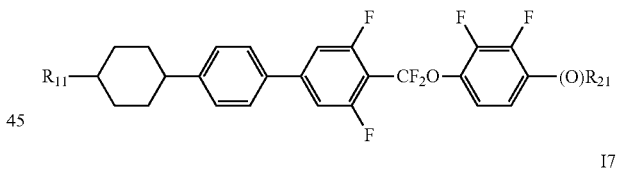
I6

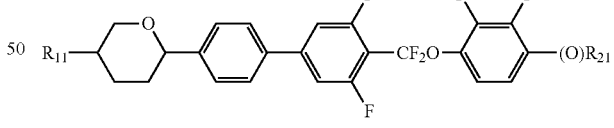
I7

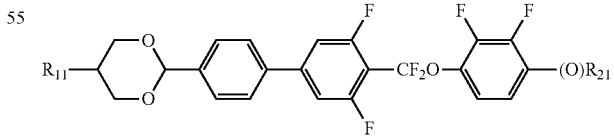
I8

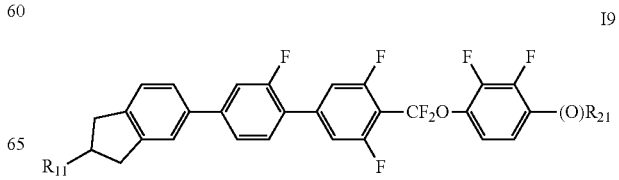
I9

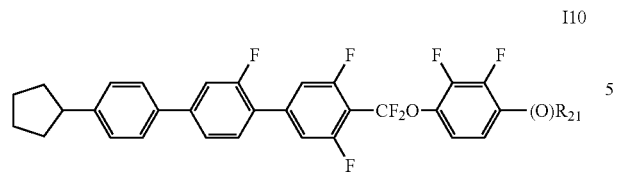 I10
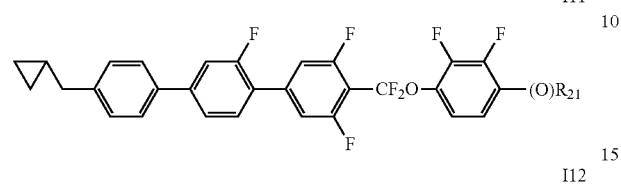 I11
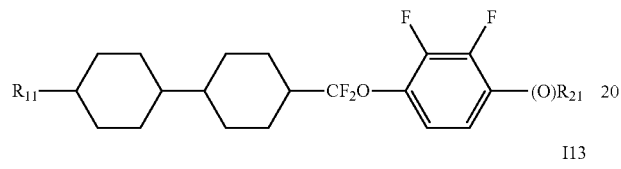 I12
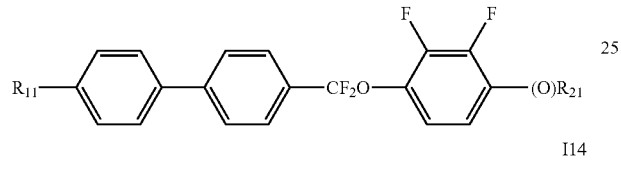 I13
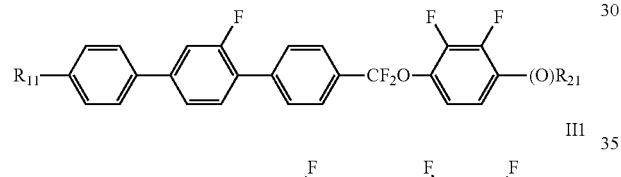 I14
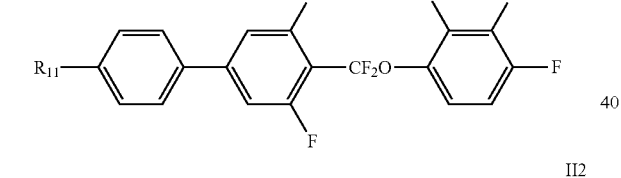 II1
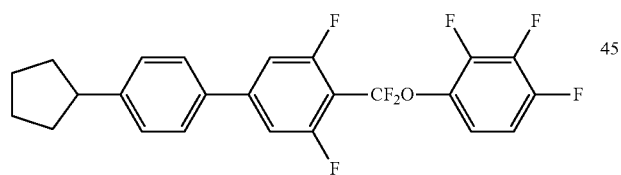 II2
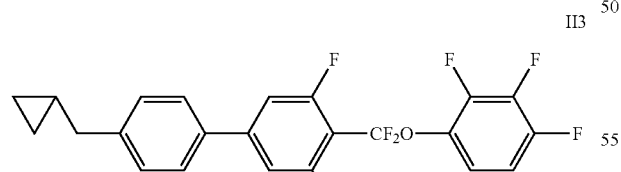 II3
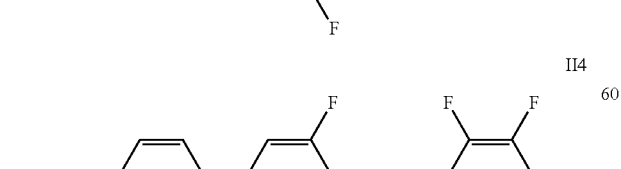 II4
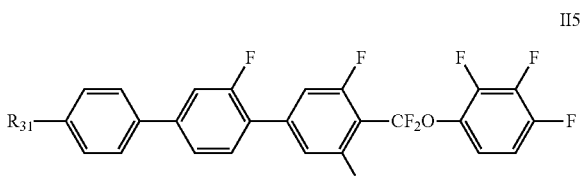 II5
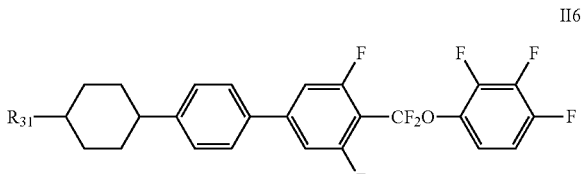 II6
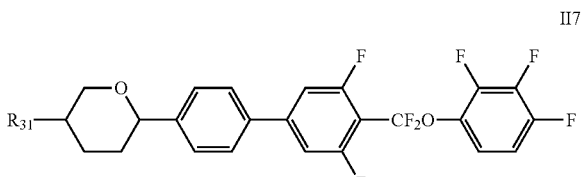 II7
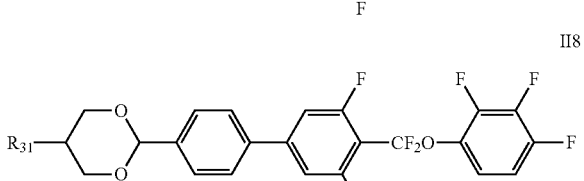 II8
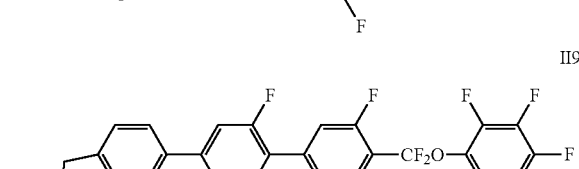 II9
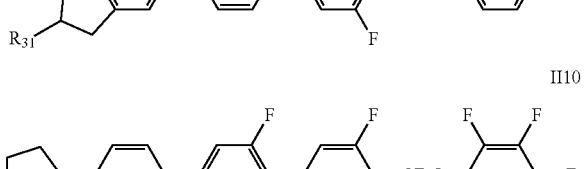 II10
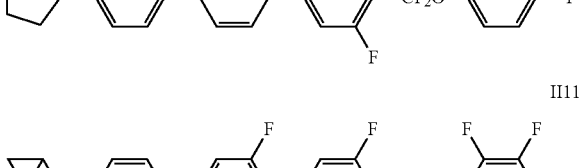 II11
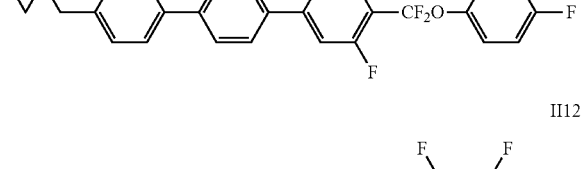 II12
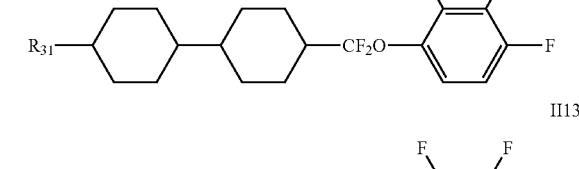 II13

The liquid crystal composition provided by the present invention may further comprise one or more compounds represented by formula IV:

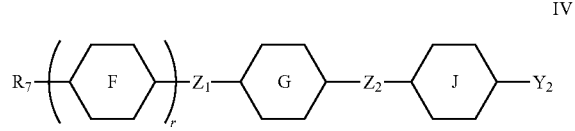

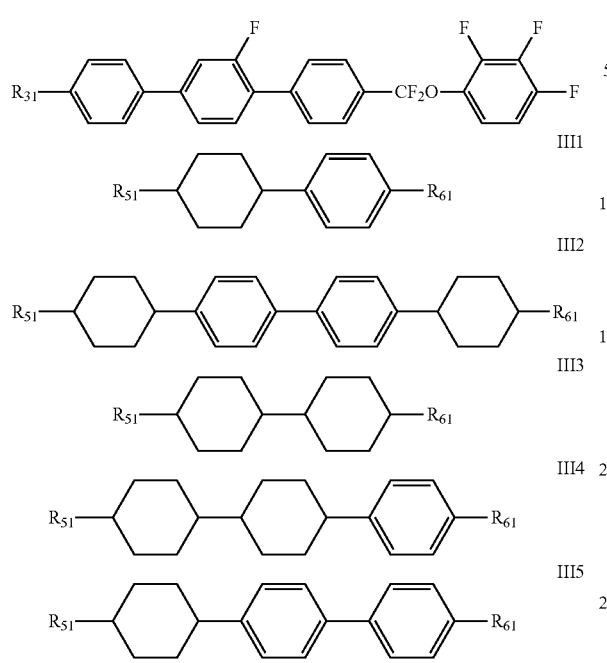

wherein $R_{11}$ and $R_{31}$ each independently represents an alkyl group having a carbon atom number of 1-6;

$R_{21}$ each independently represents an alkyl group having a carbon atom number of 1-5; and $R_{51}$ and $R_{61}$ each independently represent an alkyl group having a carbon atom number of 1-6, an alkoxy group having a carbon atom number of 1-6, an alkenyl group having a carbon atom number of 2-6 or an alkenoxy group having a carbon atom number of 3-6.

In the liquid crystal composition of the present invention, the total content in mass percentage of the one or more compounds represented by formula I is preferably 1-40%, the total content in mass percentage of the one or more compounds represented by formula II is preferably 1-40%, and the total content in mass percentage of the one or more compounds represented by formula III is preferably 1-80%.

The compounds represented by formula I also have a larger dielectric anisotropy in the liquid crystal molecule major axis parallel direction and vertical direction, with the difference ($\Delta\varepsilon$) between the major axis parallel direction dielectric anisotropy and vertical direction dielectric anisotropy being smaller. The compounds represented by formula II also have a larger dielectric anisotropy in the liquid crystal molecule major axis parallel direction and vertical direction, with the difference ($\Delta\varepsilon$) between the major axis parallel direction dielectric anisotropy and vertical direction dielectric anisotropy being greater. The two when used in combination have an effect of significantly improving the vertical direction dielectric anisotropy of the mixed liquid crystal without causing the $\Delta\varepsilon$ of the mixed liquid crystal to decrease. Therefore, the addition amount cannot be limited by $\Delta\varepsilon$, so that a larger amount of addition can be achieved, thereby significantly improving the light transmittance of the liquid crystal mixture. The compounds of formula III have a low rotary viscosity, and further have a higher clearing point (CP), and when they are used in combination with compounds represented by formulas I and II, the liquid crystal mixture has a very low rotary viscosity and a fast response speed.

wherein $R_7$ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or an fluoro-substituted alkenoxy group having a carbon atom number of 3-8; and any one or more $CH_2$ in the groups represented by $R_7$ may be substituted with cyclopentyl, cyclobutyl or cyclopropyl;

each independently represent:
one or more of

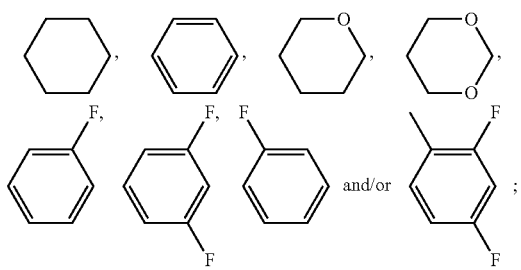

r represents 0, 1, 2 or 3;

$Z_1$ and $Z_2$ each independently represent a single bond, $-CF_2O-$, $-CH_2CH_2-$ or $-CH_2O-$; and $Y_2$ represents F, a fluoro-substituted alkyl group having a carbon atom number of 1-5, a fluoro-substituted alkoxy group having a carbon atom number of 1-5, a fluoro-substituted alkenyl group having a carbon atom number of 2-5 or a fluoro-substituted alkenoxy group having a carbon atom number of 3-8.

The one or more compounds represented by formula IV are preferably compounds of formulas IV0 to IV25

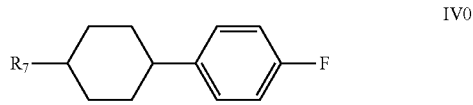

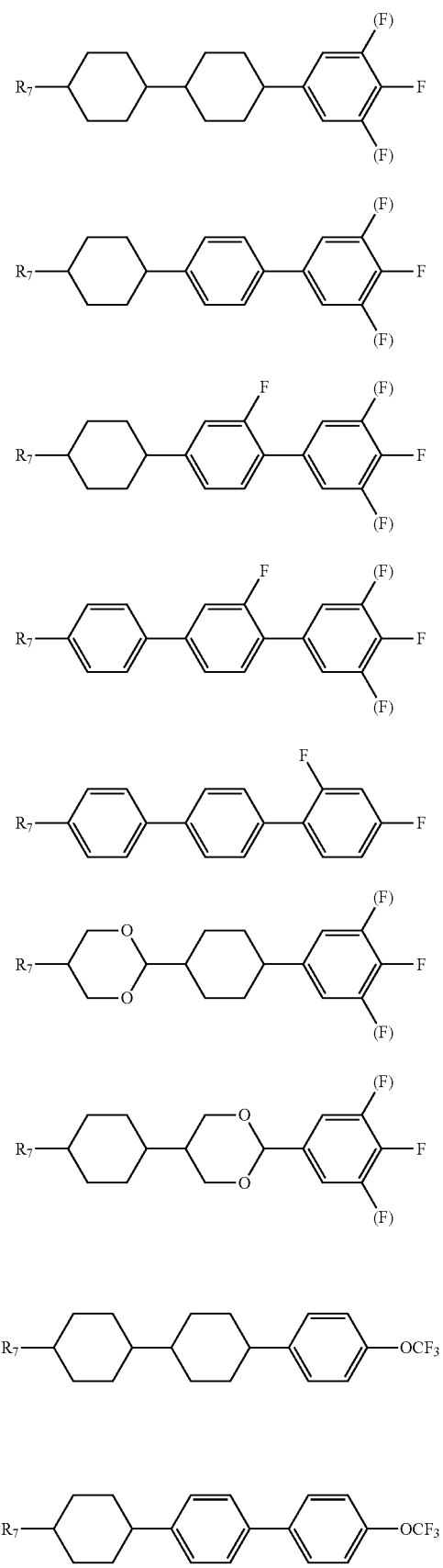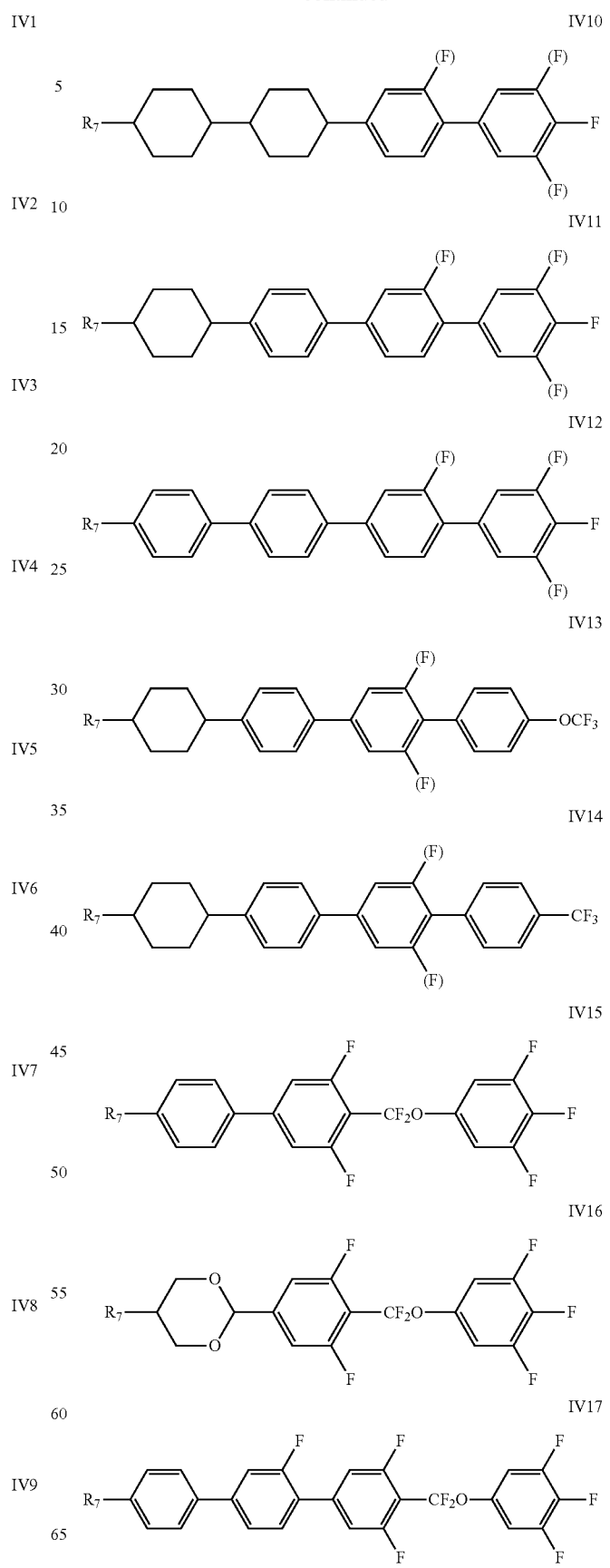

-continued

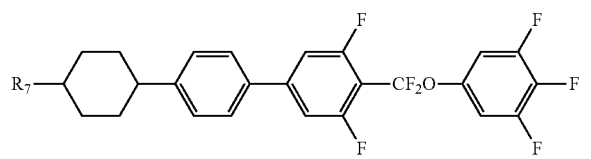
IV18

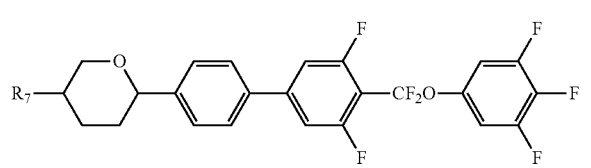
IV19

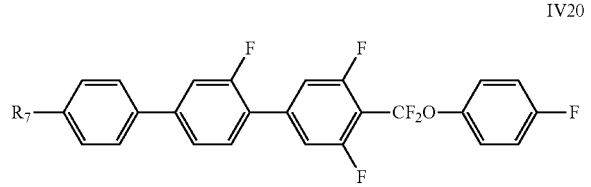
IV20

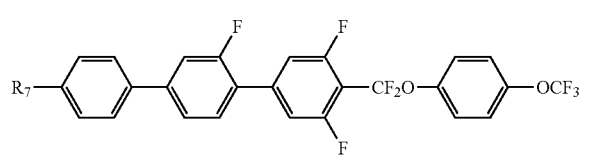
IV21

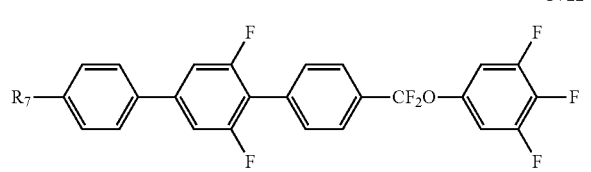
IV22

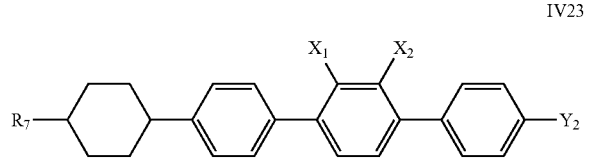
IV23

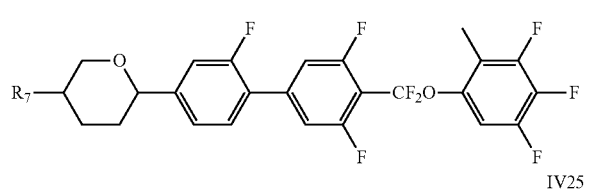
IV24

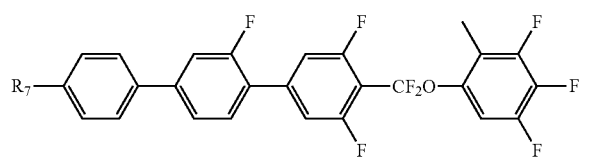
IV25 wherein $X_1$ and $X_2$ each independently represent H or F;

$R_7$ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or two $CH_2$ in the groups represented by $R_7$ may be substituted with cyclopentyl, cyclobutyl or cyclopropyl;

the (F)s each independently represent H or F.

The compounds represented by the formula IV have a larger dielectric anisotropy ($\Delta\varepsilon$), so the addition of an appropriate amount thereof is advantageous to improve the dielectric anisotropy ($\Delta\varepsilon$) of the mixed liquid crystal while reducing the drive voltage of the liquid crystal. They are suitable for use in positive TN, IPS and FFS modes, or may also be suitable for use in PSA-positive TN, IPS and FFS modes.

The addition amount of the compounds represented by the formula IV is preferably between 0% and 60%, further preferably 5-30%.

The liquid crystal composition may further comprise one or more compounds represented by formula V

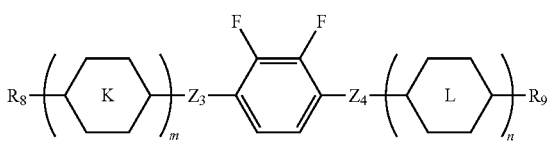
V wherein $R_8$ and $R_9$ each independently represent an alkyl group having a carbon atom number of 1-10, fluorine, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more $CH_2$ in the groups represented by $R_8$ and $R_9$ may be substituted with cyclopentyl, cyclobutyl or cyclopropyl;

$Z_3$ and $Z_4$ each independently represent a single bond, —$CH_2CH_2$— or —$CH_2O$—;

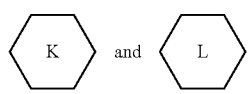

each independently represent one or more of

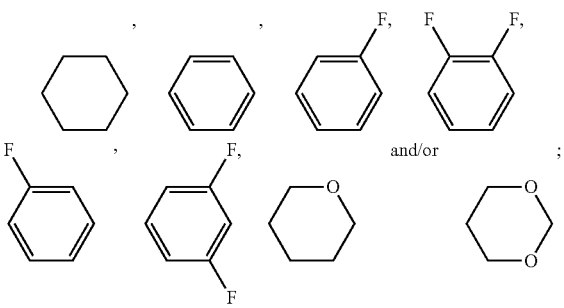

m represents 1, 2 or 3; and n represents 0 or 1.

The one or more compounds represented by formula V are preferably one or more compounds of V1 to V11:

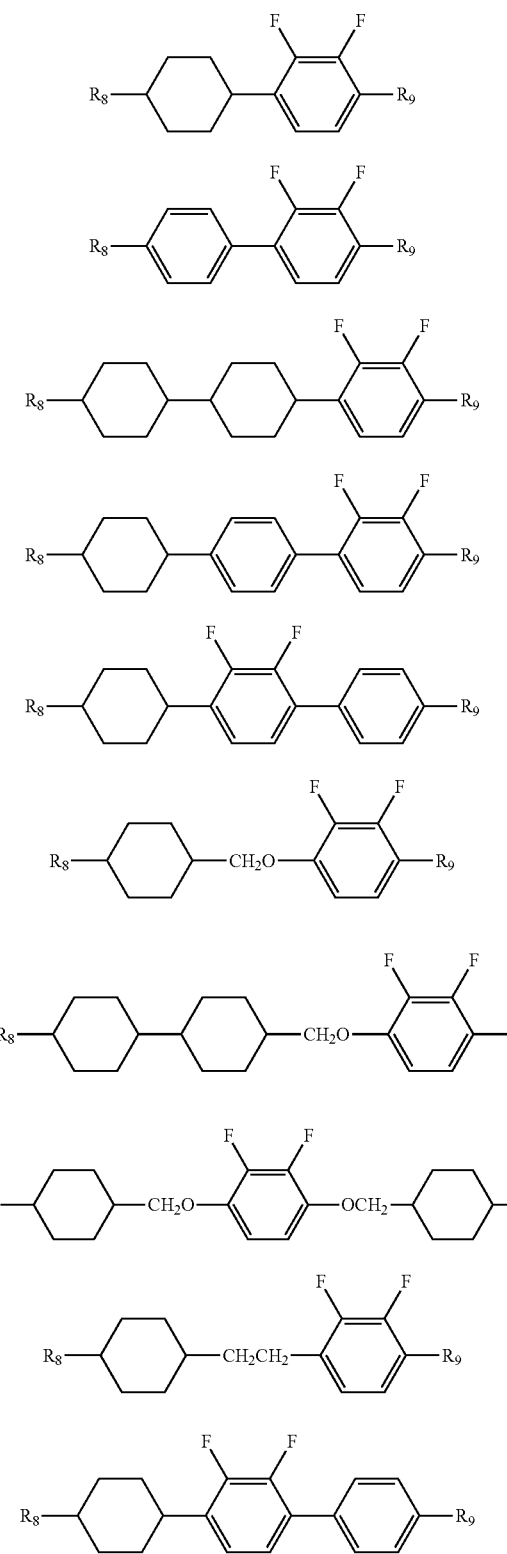

wherein $R_8$ and $R_9$ each independently represent an alkyl group having a carbon atom number of 1-10, fluorine, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more $CH_2$ in the groups represented by $R_8$ and $R_9$ may be substituted with cyclopentyl, cyclobutyl or cyclopropyl.

The liquid crystal composition further comprises one or more compounds represented by formula VI

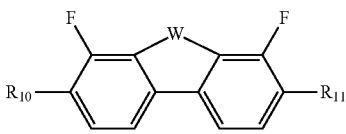

wherein $R_{10}$ and $R_{11}$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more $CH_2$ in the groups represented by $R_{10}$ and $R_{11}$ may be substituted with cyclopentyl, cyclobutyl or cyclopropyl; and W represents —O—, —S— or —CH$_2$O—.

The liquid crystal composition may further comprise one or more compounds represented by formula VII

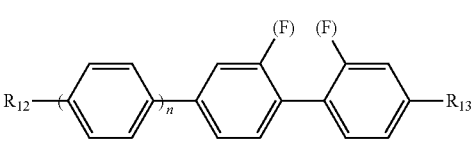

wherein $R_{12}$ represents an alkyl group having a carbon atom number of 1-5 or an alkenyl group having a carbon atom number of 2-5;

$R_{13}$ represents an F atom, an alkyl group having a carbon atom number of 1-5, an alkoxy group having a carbon atom number of 1-5 or an alkenyl group having a carbon atom number of 2-5, and any one or more $CH_2$ in the groups represented by $R_{12}$ and $R_{13}$ may be substituted with cyclopentyl, cyclobutyl or cyclopropyl;

n represents 0 or 1; and the (F)s each independently represent H or F.

The present invention relates to a liquid crystal display element or liquid crystal display comprising the above-mentioned liquid crystal composition, wherein the liquid crystal display element or liquid crystal display is an active matrix display element or display or a passive matrix display element or display.

The display element or display may be of a TN, ECB, VA, IPS, FFS, PS-TN, PS-VA, PS-IPS, PS-FFS, PA-VA, PA-IPS, PA-FFS, PI-less VA, PI-less IPS, or PI-less-FFS LCD mode.

DETAILED DESCRIPTION OF EMBODIMENTS

The present invention is further described as below in combination with particular embodiments, but the present invention is not limited to the following embodiments. The methods are all conventional methods, unless otherwise specified. The raw materials, unless otherwise specified, are commercially available.

The reaction process is generally monitored through TLC (Note to client: insert what TLC stands for), and the post-treatments after the reaction is completed are generally water washing, extracting, combining organic phases and then drying, evaporating and removing the solvent under a reduced pressure, recrystallization and column chromatographic separation; and a person skilled in the art would be able to achieve the present invention according to the following description.

In this description, the percentages are mass percentages, the temperatures are in degree Celsius (° C.), and the specific meanings of other symbols and the test conditions are as follows:

Cp represents the clearing point (° C.) of the liquid crystal measured by a DSC quantitative method;

Δn represents the optical anisotropy, $n_o$ is the refractive index of an ordinary light, $n_e$ is the refractive index of an extraordinary light, the test condition is 25±2° C. and 589 nm, and an abbe refractometer is used for the test;

Δε represents the dielectric anisotropy, $\Delta\varepsilon=\varepsilon_{//}-\varepsilon_{\perp}$, wherein $\varepsilon_{//}$ is a dielectric constant parallel to a molecular axis, and $\varepsilon_{\perp}$ is a dielectric constant perpendicular to the molecular axis, the test condition is 25±0.5° C., a 20 micron parallel cell is used, and INSTEC: ALCT-IR1 is used for the test;

γ1 represents a rotary viscosity (mPa·s), the test condition is 25±0.5° C., a 20 micron parallel cell is used, and INSTEC: ALCT-IR1 is used for the test; and Tr (%) represents a transmittance, Tr (%)=100%*bright state (Vop) luminance/light source luminance, the test device is DMS501, the test condition is 25±0.5° C., the test cell is a 3.3 micron IPS test cell, both the electrode spacing and the electrode width are 10 microns, and the included angle between the frictional direction and the electrode is 10°; therefore, there is a positive correlation between $\varepsilon_{\perp}$ and Tr, so in the evaluation of the transmittance, $\varepsilon_L$ can be used as an evaluation index for indication.

In the examples of the present invention application, liquid crystal monomer structures are represented by codes, wherein the code representation of cyclic structures, end groups and linking groups of the liquid crystals are shown in tables (I) and (II) below

TABLE (I)

Corresponding code for ring structure

| Cyclic structure | Corresponding code |
|---|---|
| cyclohexane | C |
| benzene | P |
| fluorobenzene | G |
| difluorobenzene | U |
| fluorobenzene | GI |
| difluorobenzene | Y |
| tetrahydropyran | A |
| dioxane | D |
| difluorodibenzo-pyran | BHHO-m-nFF |
| difluorodibenzofuran | B |
| difluorodibenzothiophene | B(S) |

TABLE (II)

Corresponding code for end group and linking group

| End group and linking group | Corresponding code |
|---|---|
| $C_nH_{2n+1}—$ | n- |
| $C_nH_{2n+1}O—$ | nO— |
| $—OCF_3$ | OT |
| $—CF_3$ | -T |
| $—CF_2O—$ | Q |
| $—F$ | —F |
| $—CN$ | —N |
| $—CH_2CH_2—$ | E |
| $—CH=CH—$ | V |
| $—C≡C—$ | T |
| $—COO—$ | Z |
| $—CH=CH—C_nH_{2n+1}$ | —Vn |
| 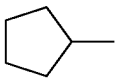 | C(5) |
| 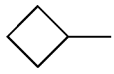 | C(4) |
|  | C(3)1 |

For example:

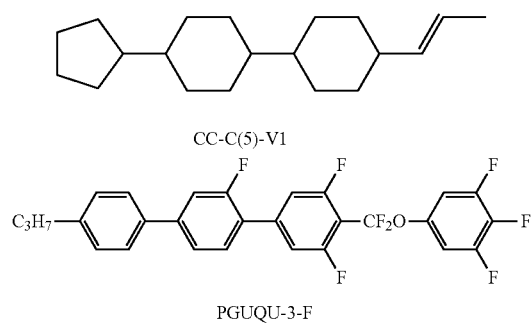

CC-C(5)-V1

PGUQU-3-F

Comparative Example 1

| Classification | Liquid crystal monomer codes | Content (%) |
|---|---|---|
| III | CC-3-V | 50 |
| III | CP-3-O2 | 5 |
| III | CCP-3-1 | 2 |
| III | CPPC-3-3 | 3 |
| II | PUQY-3-F | 10 |
| II | PGUQY-5-F | 10 |
| II | PUQY-C(3)1-F | 10 |
| II | PGUQY-C(3)1-F | 5 |
| II | APUQY-4-F | 5 |

Δε[1 KHz, 20° C.]: 2.3
$ε_⊥$: 3.1
Δn[589 nm, 20° C.]: 0.101
Cp: 78° C.
$γ_1$: 130 mPa · s.
Tr: 5.4%

Comparative Example 2

| Classification | Liquid crystal monomer codes | Content (%) |
|---|---|---|
| III | CC-3-V | 50 |
| III | CP-3-O2 | 5 |
| III | CCP-3-1 | 2 |
| III | CPPC-3-3 | 3 |
| I | PUQY-3-O2 | 5 |
| I | PUQY-C(5)-O2 | 15 |
| I | PGUQY-3-O2 | 10 |
| I | PGUQY-C(5)-O2 | 5 |
| I | DGUQY-3-O2 | 5 |

Δε[1 KHz, 20° C.]: 2.4
$ε_⊥$: 3.0
Δn[589 nm, 20° C.]: 0.101
Cp: 75° C.
$γ_1$: 120 mPa · s.
Tr: 5.3%

Example 1

| Classification | Liquid crystal monomer code | Content (%) |
|---|---|---|
| III | CC-3-V | 50 |
| III | CP-3-O2 | 5 |
| III | CCP-3-1 | 2 |
| III | CPPC-3-3 | 3 |
| II | PUQY-3-F | 5 |
| II | PGUQY-5-F | 3 |
| II | PUQY-C(3)1-F | 2 |
| II | PGUQY-C(3)1-F | 5 |
| II | APUQY-4-F | 5 |
| I | PUQY-3-O2 | 5 |
| I | PUQY-C(5)-O2 | 3 |
| I | PGUQY-3-O2 | 2 |
| I | PGUQY-C(5)-O2 | 5 |
| I | DGUQY-3-O2 | 5 |

Δε[1 KHz, 20° C.]: 2.5
$ε_⊥$: 4.7
Δn[589 nm, 20° C.]: 0.100
Cp: 78° C.
$γ_1$: 96 mPa · s.
Tr: 6.0%

After filling test cells with the liquid crystal compositions for testing, the following results are obtained: the transmittance of Comparative Example 1 is 5.4%, the transmittance of Comparative Example 2 is 5.3%, and the transmittance of Example 1 is 6% which is increased by 11% and 13%, respectively, as compared with those of Comparative Examples 1 and 2.

Example 2

| Classification | Liquid crystal monomer code | Content (%) |
|---|---|---|
| III | CC-3-V | 40 |
| III | CC-2-3 | 2 |
| III | CC-V-V1 | 3 |
| III | CPP-1-V | 3 |
| III | CLP-3-2 | 2 |
| II | PUQY-3-F | 5 |
| II | PGUQY-5-F | 5 |
| II | CPUQY-3-F | 3 |
| II | APUQY-4-F | 3 |
| II | PUQY-C(5)-F | 2 |
| II | PGUQY-C(5)-F | 2 |
| I | PUQY-3-O2 | 5 |

-continued

| Classification | Liquid crystal monomer code | Content (%) |
|---|---|---|
| I | PUQY-3-O4 | 5 |
| I | PGUQY-3-O4 | 5 |
| I | PGUQY-3-O2 | 5 |
| I | DGUQY-3-O2 | 10 |

Δε[1 KHz, 20° C.]: 4.0
$\varepsilon_\perp$: 4.6
Δn[589 nm, 20° C.]: 0.107
Cp: 81° C.
$\gamma_1$: 80 mPa · s.
Tr: 6.0%

Example 3

| Classification | Liquid crystal monomer code | Content (%) |
|---|---|---|
| III | CC-3-V | 35 |
| III | CC-2-3 | 5 |
| III | CPP-1-5 | 5 |
| II | PUQY-3-F | 10 |
| II | PGUQY-5-F | 10 |
| II | PUQY-5-F | 10 |
| I | PUQY-C(3)1-O2 | 5 |
| I | PGUQY-C(3)1-O2 | 5 |
| I | PUQY-3-O2 | 5 |
| I | PGUQY-3-O2 | 5 |
| I | APUQY-3-O2 | 5 |

Δε[1 KHz, 20° C.]: 4.0
$\varepsilon_\perp$: 4.9
Δn[589 nm, 20° C.]: 0.114
Cp: 77° C.
$\gamma_1$: 85 mPa · s.
Tr: 6.1%

Example 4

| Classification | Liquid crystal monomer code | Content (%) |
|---|---|---|
| III | CC-3-V | 45 |
| III | CC-2-3 | 5 |
| III | CCP-3-1 | 5 |
| II | PUQY-3-F | 10 |
| II | PGUQY-5-F | 10 |
| II | PUQY-5-F | 10 |
| II | PGUQY-4-F | 10 |
| I | PGUQY-3-O2 | 5 |

Δε[1 KHz, 20° C.]: 4.0
$\varepsilon_\perp$: 4.9
Δn[589 nm, 20° C.]: 0.114
Cp: 77° C.
$\gamma_1$: 82 mPa · s.
Tr: 6.0%

Example 5

| Classification | Liquid crystal monomer code | Content (%) |
|---|---|---|
| III | CC-3-V | 30 |
| III | CC-3-5 | 5 |
| III | CCP-V-1 | 5 |
| II | DGUQY-3-F | 5 |
| II | PGUQY-5-F | 15 |
| I | PUQY-3-O2 | 10 |
| I | APUQY-3-O2 | 10 |

| Classification | Liquid crystal monomer code | Content (%) |
|---|---|---|
| I | CPUQY-3-O2 | 5 |
| I | PGUQY-3-O2 | 15 |

Δε[1 KHz, 20° C.]: 4.0
$\varepsilon_\perp$: 4.9
Δn[589 nm, 20° C.]: 0.114
Cp: 81° C.
$\gamma_1$: 87 mPa · s.
Tr: 6.1%

Example 6

| Classification | Liquid crystal monomer code | Content (%) |
|---|---|---|
| IV | CCU-3-F | 5 |
| III | CC-3-V | 40 |
| III | CCP-V-1 | 5 |
| III | CCP-V2-1 | 5 |
| II | DGUQY-3-F | 8 |
| II | PGUQY-5-F | 2 |
| I | PUQY-3-O2 | 10 |
| I | PGUQY-3-O2 | 10 |
| I | PGUQY-C(3)1-O2 | 15 |

Δε[1 KHz, 20° C.]: 2.0
$\varepsilon_\perp$: 5.7
Δn[589 nm, 20° C.]: 0.105
Cp: 100° C.
$\gamma_1$: 70 mPa · s.
Tr: 6.3%

Example 7

| Classification | Liquid crystal monomer code | Content (%) |
|---|---|---|
| IV | CCU-3-F | 5 |
| IV | CPU-3-F | 5 |
| IV | CCP-3-OT | 5 |
| IV | PGUQU-C(5)-F | 5 |
| III | CC-3-V | 30 |
| III | CCP-3-V1 | 2 |
| III | CP-3-O2 | 3 |
| II | DGUQY-3-F | 10 |
| II | PGUQY-5-F | 10 |
| II | PUQY-3-F | 10 |
| II | CUQY-3-F | 5 |
| I | PUQY-3-O2 | 5 |
| I | PUQY-5-O2 | 5 |

Δε[1 KHz, 20° C.]: 2.0
$\varepsilon_\perp$: 6.0
Δn[589 nm, 20° C.]: 0.105
Cp: 100° C.
$\gamma_1$: 73 mPa · s.
Tr: 6.4%

Example 8

| Classification | Liquid crystal monomer code | Content (%) |
|---|---|---|
| IV | CCU-3-F | 5 |
| IV | CGU-5-F | 5 |
| IV | CPU-3-F | 5 |
| IV | PGU-3-F | 5 |
| IV | PGUQU-3-F | 5 |
| IV | PPGI-3-F | 5 |

-continued

| Classification | Liquid crystal monomer code | Content (%) |
|---|---|---|
| III | CC-3-V | 25 |
| III | CPP-3-2 | 5 |
| II | PUQY-3-F | 5 |
| I | PUQY-3-O2 | 10 |
| I | PUQY-3-O4 | 10 |
| I | PGUQY-3-O2 | 10 |
| I | PGUQY-4-O2 | 5 |

$\Delta\varepsilon$[1 KHz, 20° C.]: 2.0
$\varepsilon_\perp$: 6.2
$\Delta$n[589 nm, 20° C.]: 0.105
Cp: 100° C.
$\gamma_1$: 71 mPa · s.
Tr: 6.3%

Example 9

| Classification | Liquid crystal monomer code | Content (%) |
|---|---|---|
| V | CY-3-O2 | 2 |
| V | CCY-3-O2 | 3 |
| V | PY-5-O2 | 2 |
| V | CPY-3-O2 | 3 |
| IV | CCU-3-F | 5 |
| IV | CGU-5-F | 3 |
| IV | PGUQU-3-F | 2 |
| III | CC-3-V | 20 |
| II | PUQY-3-F | 10 |
| II | PUQY-5-F | 10 |
| II | PGUQY-3-F | 10 |
| I | PUQY-3-O2 | 10 |
| I | PUQY-3-O4 | 10 |
| I | PGUQY-3-O2 | 10 |

$\Delta\varepsilon$[1 KHz, 20° C.]: 4.7
$\varepsilon_\perp$: 6.3
$\Delta$n[589 nm, 20° C.]: 0.133
Cp: 105° C.
$\gamma_1$: 68 mPa · s.
Tr: 6.5%

Example 10

| Classification | Liquid crystal monomer code | Content (%) |
|---|---|---|
| V | CPY-3-O2 | 5 |
| V | PYP-3-O2 | 5 |
| V | COY-3-O2 | 5 |
| V | CCOY-3-O2 | 5 |
| IV | CCU-3-F | 5 |
| IV | CGU-5-F | 5 |
| IV | PGUQU-3-F | 5 |
| III | CC-3-V | 30 |
| III | CCP-V-1 | 5 |
| III | PP-1-5 | 5 |
| II | PUQY-3-F | 7 |
| II | PUQY-5-F | 5 |
| II | PGUQY-3-F | 3 |
| I | PUQY-3-O2 | 2 |
| I | PUQY-3-O4 | 3 |
| I | PGUQY-3-O2 | 5 |

$\Delta\varepsilon$[1 KHz, 20° C.]: 3.3
$\varepsilon_\perp$: 7.2
$\Delta$n[589 nm, 20° C.]: 0.110
Cp: 105° C.
$\gamma_1$: 52 mPa · s.
Tr: 6.2%

Example 11

| Classification | Liquid crystal monomer code | Content (%) |
|---|---|---|
| VI | B-3-O2 | 2 |
| VI | B(S)-3-O4 | 2 |
| VI | BHHO-3-2FF | 1 |
| V | CPY-3-O2 | 5 |
| V | COY-3-O2 | 5 |
| V | CCOY-3-O2 | 5 |
| IV | CCU-3-F | 5 |
| IV | CGU-5-F | 5 |
| IV | PGUQU-3-F | 5 |
| IV | DCU-3-F | 5 |
| IV | CDU-3-F | 5 |
| IV | CCGU-3-F | 5 |
| III | CC-3-V | 30 |
| II | PUQY-3-F | 2 |
| II | PUQY-5-F | 2 |
| II | PGUQY-3-F | 1 |
| I | PUQY-3-O2 | 5 |
| I | PUQY-3-O4 | 5 |
| I | PGUQY-3-O2 | 5 |

$\Delta\varepsilon$[1 KHz, 20° C.]: 4.1
$\varepsilon_\perp$: 7.8
$\Delta$n[589 nm, 20° C.]: 0.102
Cp: 110° C.
$\gamma_1$: 52 mPa · s.
Tr: 6.5%

Example 12

| Classification | Liquid crystal monomer code | Content (%) |
|---|---|---|
| VII | PGP-3-2 | 2 |
| VII | PGP-3-F | 2 |
| VII | PP-1-5 | 2 |
| VII | PGP-V-F | 1 |
| VI | B-3-O2 | 3 |
| V | CPY-3-O2 | 5 |
| IV | CCU-3-F | 5 |
| IV | CGU-5-F | 5 |
| IV | PGUQU-3-F | 5 |
| IV | DCU-3-F | 5 |
| IV | CDU-3-F | 5 |
| III | CC-2-3 | 2 |
| III | CC-3-V | 40 |
| III | CC-3-V1 | 2 |
| III | CCP-V-1 | 1 |
| II | PUQY-3-F | 2 |
| II | PUQY-5-F | 3 |
| II | PGUQY-3-F | 5 |
| I | PUQY-3-O2 | 5 |
| I | PUQY-3-O4 | 2 |
| I | PGUQY-3-O2 | 3 |

$\Delta\varepsilon$[1 KHz, 20° C.]: 5.7
$\varepsilon_\perp$: 8.2
$\Delta$n[589 nm, 20° C.]: 0.104
Cp: 105° C.
$\gamma_1$: 51 mPa · s.
Tr: 6.5%

The liquid crystal composition of the present invention has a good stability against light and heat, a lower viscosity, a wider refractive index that may be achieved by adjustment, and a higher clearing point (a very wide service temperature range), and in particular, the liquid crystal composition has a higher light transmittance, thus allowing a display device to have a higher brightness or an energy saving effect.

The invention claimed is:
1. A liquid crystal composition comprising one or more of compounds represented by formulas I1 to I14; one or more of compounds represented by formulas II1 to II14; and one or more of compounds represented by formulas III1 to III5:
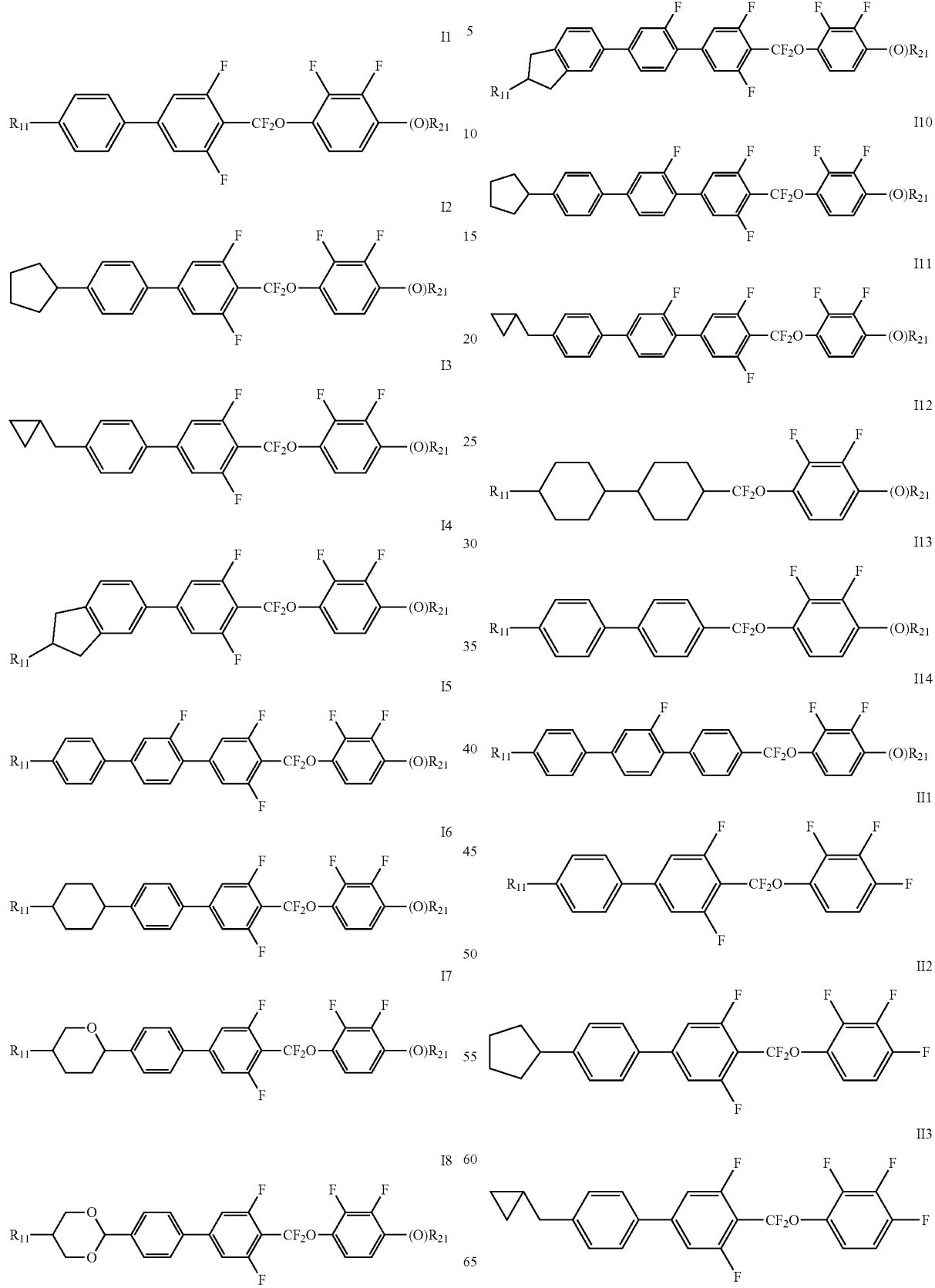

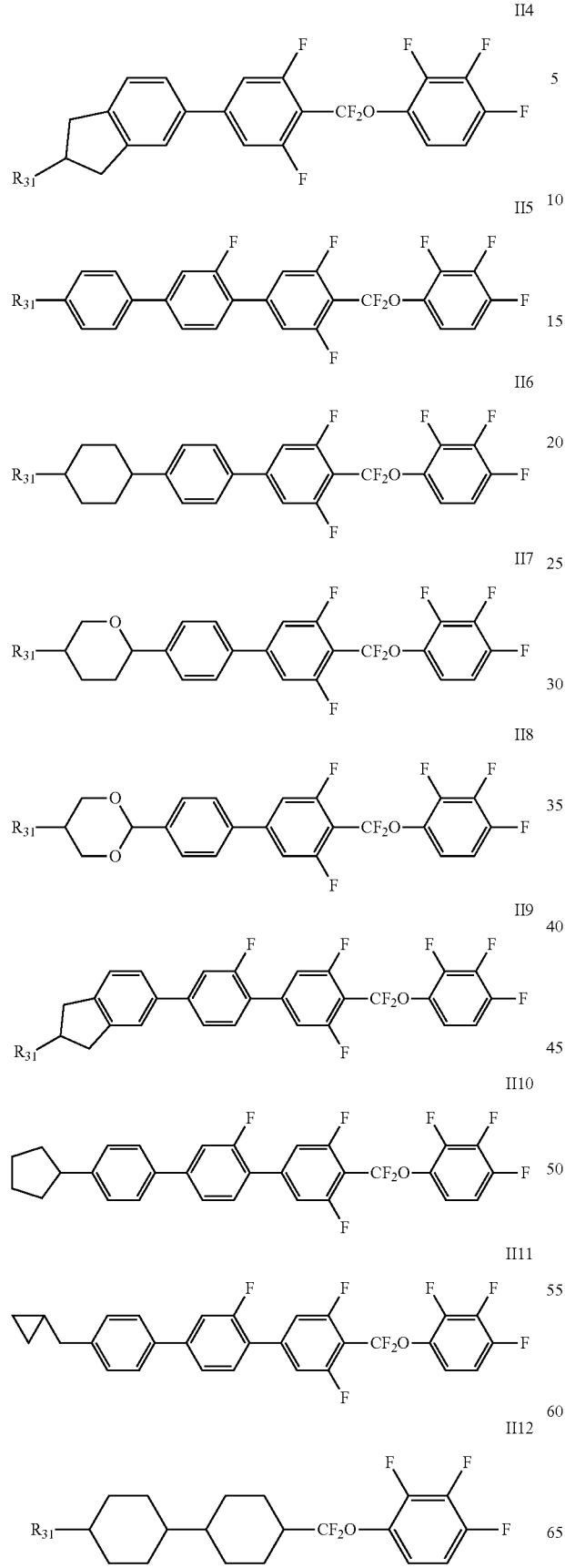
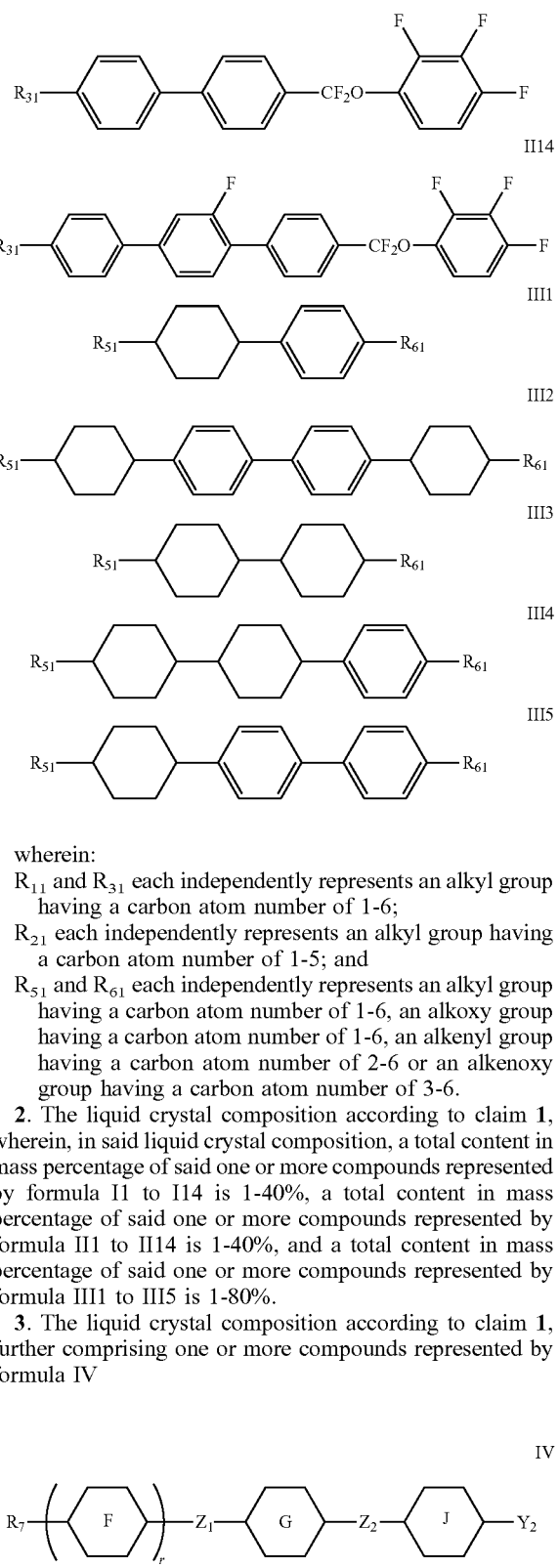

wherein:
R$_{11}$ and R$_{31}$ each independently represents an alkyl group having a carbon atom number of 1-6;
R$_{21}$ each independently represents an alkyl group having a carbon atom number of 1-5; and
R$_{51}$ and R$_{61}$ each independently represents an alkyl group having a carbon atom number of 1-6, an alkoxy group having a carbon atom number of 1-6, an alkenyl group having a carbon atom number of 2-6 or an alkenoxy group having a carbon atom number of 3-6.

2. The liquid crystal composition according to claim 1, wherein, in said liquid crystal composition, a total content in mass percentage of said one or more compounds represented by formula I1 to I14 is 1-40%, a total content in mass percentage of said one or more compounds represented by formula II1 to II14 is 1-40%, and a total content in mass percentage of said one or more compounds represented by formula III1 to III5 is 1-80%.

3. The liquid crystal composition according to claim 1, further comprising one or more compounds represented by formula IV

IV $$R_7 \left( \boxed{F} \right)_r - Z_1 - \boxed{G} - Z_2 - \boxed{J} - Y_2$$

wherein R$_7$ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or an fluoro-substituted alkenoxy group having a carbon atom number of 3-8; and any one or more $CH_2$ in the groups represented by $R_7$ may be substituted with cyclopentyl, cyclobutyl or cyclopropyl;

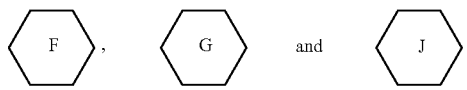

each independently represent:

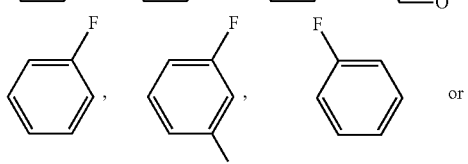

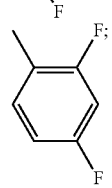

r represents 0, 1, 2 or 3;

$Z_1$ and $Z_2$ each independently represent a single bond, —$CF_2O$—, —$CH_2CH_2$— or —$CH_2O$—; and $Y_2$ represents F, a fluoro-substituted alkyl group having a carbon atom number of 1-5, a fluoro-substituted alkoxy group having a carbon atom number of 1-5, a fluoro-substituted alkenyl group having a carbon atom number of 2-5 or a fluoro-substituted alkenoxy group having a carbon atom number of 3-8.

4. The liquid crystal composition according to claim 3, wherein said one or more compounds represented by formula IV are one or more of compounds represented by formulas IV0 to IV25:

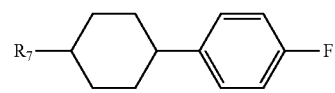
IV0

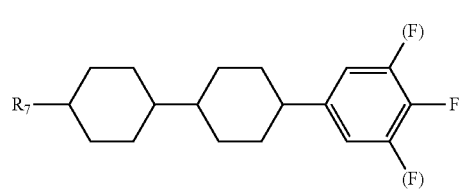
IV1

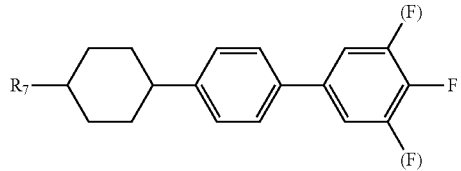
IV2

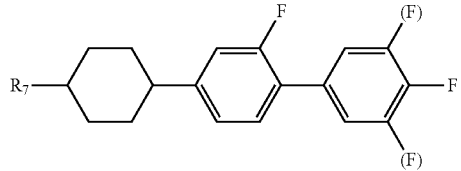
IV3

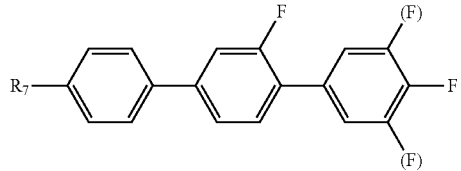
IV4

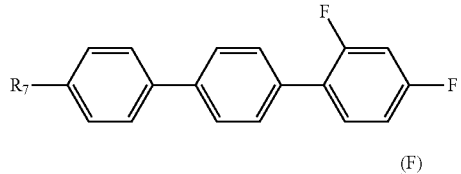
IV5

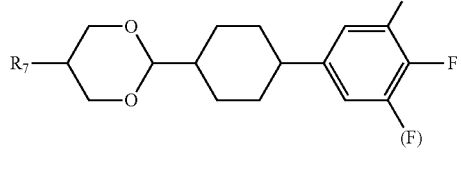
IV6

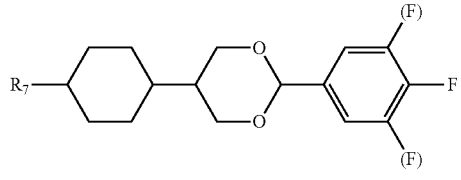
IV7

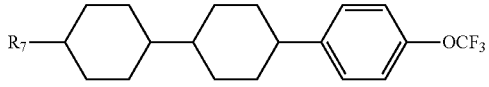
IV8

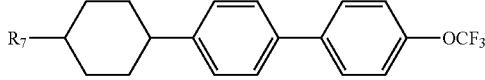
IV9

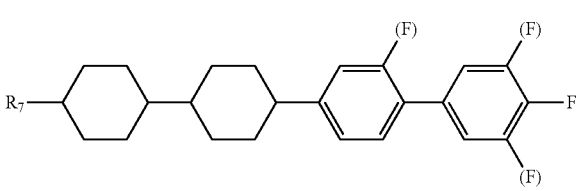
IV10

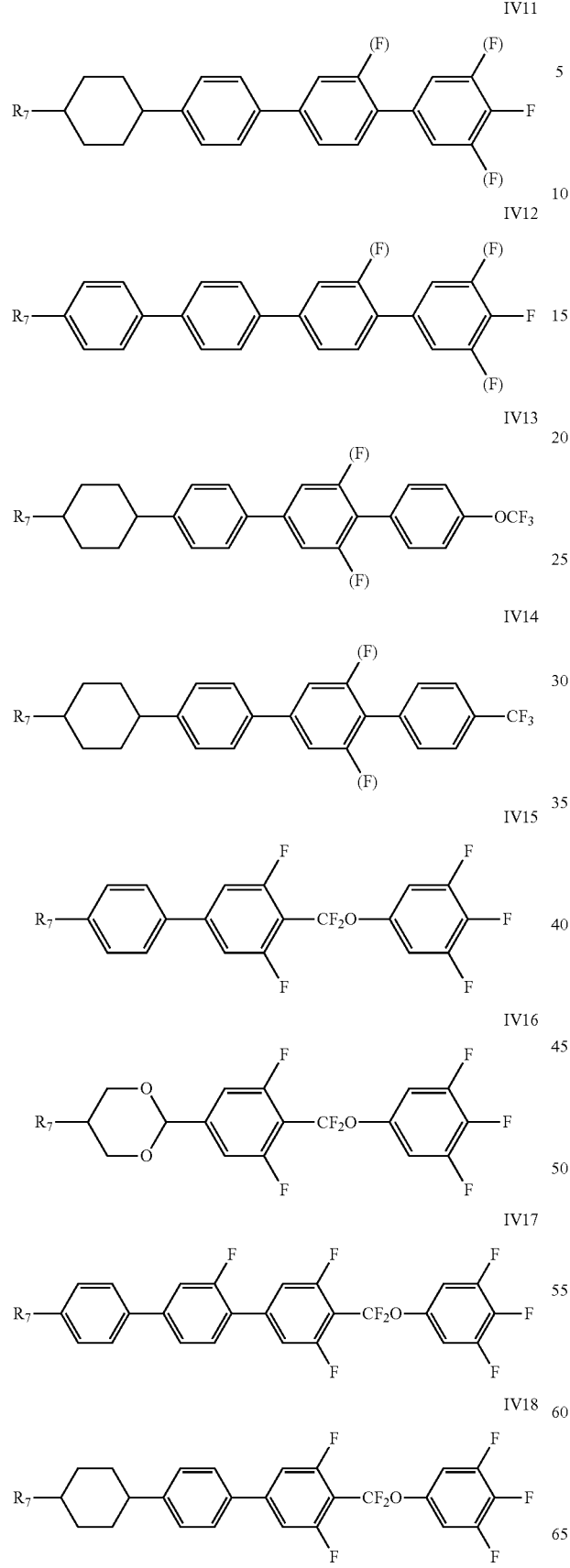
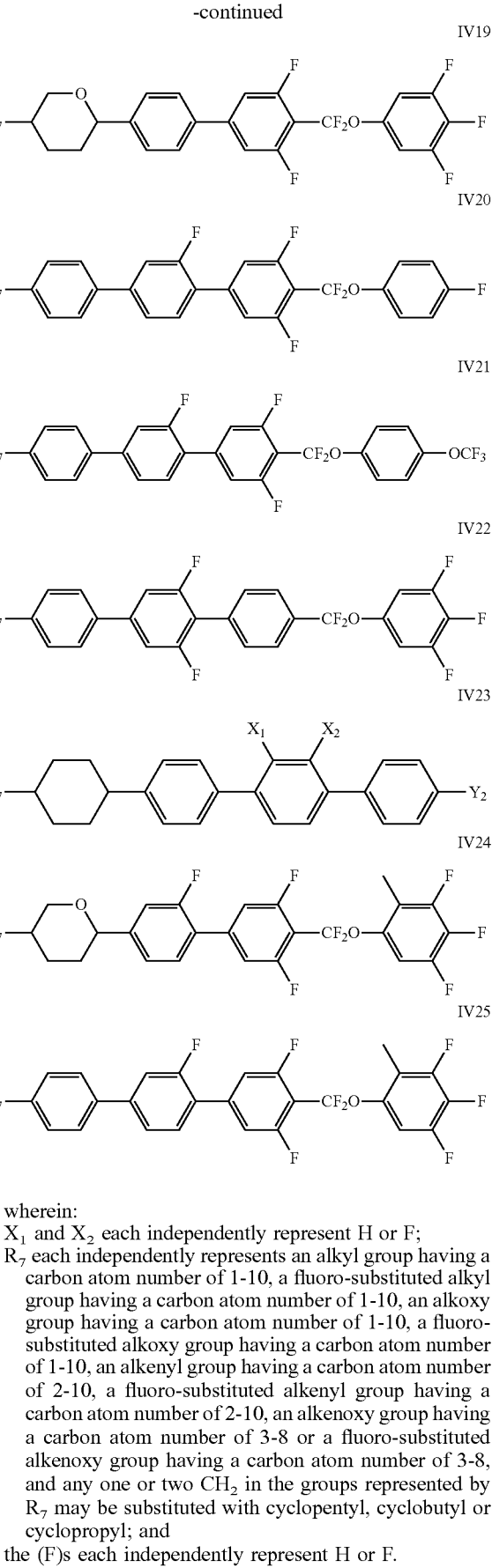

wherein:
X₁ and X₂ each independently represent H or F;
R₇ each independently represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or two CH₂ in the groups represented by R₇ may be substituted with cyclopentyl, cyclobutyl or cyclopropyl; and
the (F)s each independently represent H or F.

5. A liquid crystal display element or liquid crystal display comprising the liquid crystal composition of claim 1, wherein said liquid crystal display element or liquid crystal display is an active matrix display element or display or a passive matrix display element or display.

\* \* \* \* \*